T. S. W. RUSSELL.
Device for Holding Horses.
No. 128,814. Patented July 9, 1872.
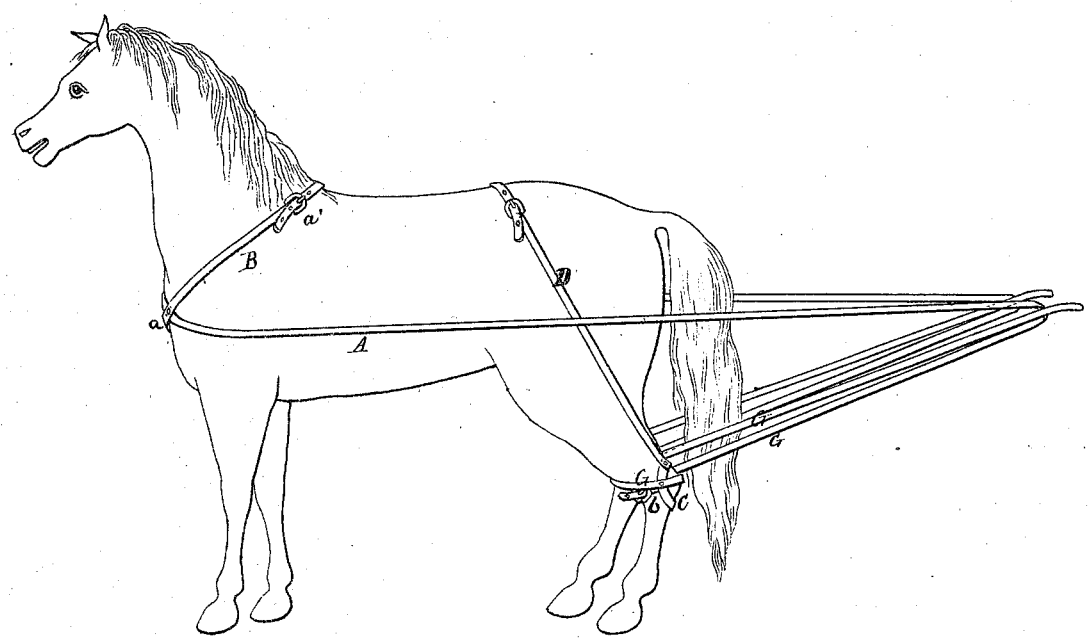
WITNESSES.
Villette Anderson
Geo E Upham
INVENTOR.
T. S. W. Russell
Chipman Hosmer & Co.
Attys.

UNITED STATES PATENT OFFICE.

THOMAS S. W. RUSSELL, OF KANSAS, KENTUCKY.

IMPROVEMENT IN DEVICES FOR HOLDING HORSES.

Specification forming part of Letters Patent No. 128,814, dated July 9, 1872.

*To all whom it may concern:*

Be it known that I, T. S. W. RUSSELL, of Kansas, in the county of Graves and State of Kentucky, have invented a new and valuable Improvement in Charm-Halters; and I do hereby declare that the following is a full, clear, and exact description of the construction and operation of the same, reference being had to the annexed drawing making a part of this specification and to the letters and figures of reference marked thereon.

The figure of the drawing is a representation of my invention as applied.

My invention has relation to an apparatus for the control of horses during surgical operations and under other circumstances; and it consists in the novel arrangement and combination of straps and buckles, as and for the purpose hereinafter more fully described.

Referring to the accompanying drawing, A represents two long straps crossing each other and connected together at $a$, their ends extending thence a sufficient distance to form a band or collar, B, to pass around the horse's neck. The ends of the straps A for such purpose are connected by a buckle at $a'$. From the point $a$ the straps A pass around the forearms of the animal, and thence run back at the sides to a fence or other object passed around a bar or through rings or holes, and attached to straps G, which are thence brought forward to the middle joints of the hind legs. At the points on said straps where they reach the hind legs of the animal leather rings C are attached, the straps crossing them diametrically. The straps G, after being brought forward to the horse's hind legs, as above stated, are passed around the joints from the outside and the caps or washers C laid on the hocks, and there secured by straps $b$ passing around the joint and buckled. The straps are sewed to the strap A on either side of the caps C. Attached to the upper part of each cap is a strap, D, which, when said caps are arranged, is passed over the horse's loins and buckled to its mate. These straps prevent the hock-caps from falling. After the straps G have been passed around the hock-joint and between the horse's hind legs they are carried back and given into the hands of an attendant, who, by pulling on the straps, brings the animal under perfect control, preventing him from moving his hind legs sufficiently to render him unmanageable. By pulling with considerable force on the straps the horse's hind legs may be raised and the animal thrown. The straps A are designed to be about fifteen feet in length. Instead of being crossed and stitched together, as shown at $a$, these straps may be buckled to a ring suspended from the collar or neck-strap, which will enable the straps A to be removed and the rest of the apparatus used for another purpose. The other purpose referred to is keeping the animal within proper bounds while grazing. To this effect, the straps G, after being disconnected from the straps A, are brought around the horse's thighs and thence carried forward and buckled to the upper part of the collar or neck-strap sufficiently tight to prevent the animal from leaping over fences.

What I claim as my invention, and desire to secure by Letters Patent, is—

The improved apparatus for controlling horses, consisting of the neck-piece B, side-reins A, leg-straps G, loin-straps D, hock-caps C, and joint-belts $b$, substantially as and for the purpose specified.

In testimony that I claim the above I have hereunto subscribed my name in the presence of two witnesses.

THOMAS SYDNEY WHITE RUSSELL.

Witnesses:
 A. N. BOON,
 J. D. M. RUSSELL,
 W. W. ROBERTSON.